(12) United States Patent
Hudson et al.

(10) Patent No.: US 7,191,364 B2
(45) Date of Patent: Mar. 13, 2007

(54) AUTOMATIC ROOT CAUSE ANALYSIS AND DIAGNOSTICS ENGINE

(75) Inventors: William Hunter Hudson, Kirkland, WA (US); Reiner Fink, Mercer Island, WA (US); Geoff Pease, Bothell, WA (US); Gerald Maffeo, Woodinville, WA (US); Yi Meng, Bellevue, WA (US); Eric LeVine, Seattle, WA (US); Andrew L. Bliss, Redmond, WA (US); Andre Vachon, Redmond, WA (US); Kshitiz K. Sharma, Bellevue, WA (US); Jing Shan, Boston, MA (US)

(73) Assignee: Microsoft Corporation, Redmond, WA (US)

( * ) Notice: Subject to any disclaimer, the term of this patent is extended or adjusted under 35 U.S.C. 154(b) by 509 days.

(21) Appl. No.: 10/713,867

(22) Filed: Nov. 14, 2003

(65) Prior Publication Data

US 2005/0120273 A1    Jun. 2, 2005

(51) Int. Cl.
*G06F 11/00* (2006.01)
(52) U.S. Cl. .................. 714/38; 714/37; 717/124; 707/202
(58) Field of Classification Search .................. 714/38
See application file for complete search history.

(56) References Cited

U.S. PATENT DOCUMENTS

| | | | |
|---|---|---|---|
| 6,665,758 B1 * | 12/2003 | Frazier et al. | 710/200 |
| 6,742,141 B1 * | 5/2004 | Miller | 714/26 |
| 6,763,517 B2 * | 7/2004 | Hines | 717/124 |
| 6,859,893 B2 * | 2/2005 | Hines | 714/38 |
| 7,000,150 B1 * | 2/2006 | Zunino et al. | 714/38 |
| 2002/0112200 A1 * | 8/2002 | Hines | 714/38 |
| 2003/0084376 A1 * | 5/2003 | Nash et al. | 714/38 |
| 2004/0078686 A1 * | 4/2004 | Toyooka et al. | 714/38 |
| 2004/0098640 A1 * | 5/2004 | Smith | 714/39 |
| 2004/0153823 A1 * | 8/2004 | Ansari | 714/38 |
| 2004/0194063 A1 * | 9/2004 | Pereira | 717/124 |

OTHER PUBLICATIONS

"Microsoft Online Crash Analysis", 2 pp. © 2003 Microsoft Corporation [Downloaded from the World Wide Web on May 26, 2005].

(Continued)

*Primary Examiner*—Robert Beausoliel
*Assistant Examiner*—Christopher McCarthy
(74) *Attorney, Agent, or Firm*—Klarquist Sparkman LLP

(57) ABSTRACT

A large portion of software bugs are related to hangs. Analyzing and diagnosing hang-related bugs involves capturing data from a hung program and extracting attributes from the captured data. Extracting attributes from the capture data provides a scheme to determine relevant characteristics of the hang. Moreover, the extracted attributes may be compared to known issues and, based on that comparison, a bug may be classified as known or unknown. Alternatively, triage may be performed on the client computing device in order to determine the potential cause of the hang event. Once the potential cause of the hang event has been determined, troubleshooting steps may be performed on the client computing device to quarantine it. Ultimately, if the hang-inducing bug is known, a user may be provided with a solution to the bug. Alternatively, if the bug is unknown, implementations of the invention send the captured data to be analyzed and fixed by the software's provider.

19 Claims, 8 Drawing Sheets

OTHER PUBLICATIONS

"Dr. Watson and Windows 3.1", 2 pp. © 2005 Microsoft Corporation [Downloaded from the World Wide Web on May 26, 2005].

"Description of the Dr. Watson (Drwatson.exe) Tool", 1 p. © 2005 Microsoft Corporation [Downloaded from the World Wide Web on May 26, 2005].

"How to Troubleshoot Program Faults with Dr. Watson", 3 pp. © 2005 Microsoft Corporation [Downloaded from the World Wide Web on May 26, 2005].

"An Annotated Dr. Watson Log File", 4 pp. © 2005 Microsoft Corporation [Downloaded from the World Wide Web on May 26, 2005].

* cited by examiner

AUTOMATIC ROOT CAUSE ANALYSIS AND DIAGNOSTICS ENGINE

TECHNICAL FIELD

The invention relates generally to analyzing defects in software. More specifically, the invention relates to analyzing and diagnosing software defects caused by hangs.

BACKGROUND

In a computer (e.g., personal computer (PC) or the like), the abnormal termination of a software process by either the operating system (OS) or an end user indicates the possibility of a defect (bug) in the software. Software typically contains a number of bugs classifiable into two general categories: crashes and hangs. Among the chief concerns for program developers has always been identifying software defects that cause computers to crash. Software crashes are fatal system errors, which usually result in the abnormal termination of a program by a kernel or system thread. Normally, when a crash-causing bug is discovered, the software provider obtains diagnostic data, attempts to reproduce the error, and, depending on the severity of the bug, creates and distributes a fix for the bug.

One way of diagnosing crash-induced bugs involves examining a log file containing diagnostic data including commands, events, instructions, program error number, computer processor type, and/or other pertinent diagnostic information. The log file typically is generated right after a crash has been detected. For example, a Microsoft® Windows operative PC loads Watson, a debugging tool which monitors running processes and logs useful diagnostic data when a crash is detected. After a crash, the Watson log file may be sent to the software provider for analysis. In some cases, a log file does not contain enough information to diagnose a problem, thus, a crash dump may be required to troubleshoot the problem. A crash dump is generated when the physical contents of memory are written to a predetermined file location. The resulting file is a binary file. Analyzing crash dumps is more complex than analyzing log files because the binary file usually needs to be loaded into a debugger and manually traversed by a troubleshooter.

In an effort to more effectively troubleshoot bugs, some software providers attempt to perform varying degrees of computerized analysis on log and crash files. For example, Microsoft has introduced its Online Crash Analysis (OCA) engine to automate the process of troubleshooting crashes. The OCA engine allows users to submit, through a web browser, a crash log or a crash mini-dump file to Microsoft. The analysis engine compares data from the uploaded file to a database of known issues. If the bug is known and a patch or workaround is available, the user is notified of the solution. Otherwise, the uploaded file is used by troubleshooters to diagnose the bug.

A problem with all of the above-mentioned troubleshooting techniques is that they attempt to diagnose crashes only, overlooking hangs, the second major class of bugs. Moreover, these approaches rely heavily on manual analysis of bugs and require the user to send in a report to the software provider, where most of the analysis is performed, wasting the software provider's resources.

In reality, many reported bugs are related to hangs. However, software providers typically expend their debugging efforts fixing crash-inducing bugs, even though, to end-users, crashes and hangs often appear to be the same thing. A software hang occurs when a piece of software appears to stop responding or when a software thread looks inactive. Hangs often result in the abnormal termination of a recoverable software process by the end-user. Abnormal termination of software by any means, including user-induced termination, may indicate the presence of a bug in the software. For example, a piece of software may normally take 10 or 15 seconds to paint a user interface, but under a given set of circumstances, the user interface thread may call an API that takes a long time to return or, alternatively, the user interface thread may make a network call that requires a response before painting the user interface. Thus, the time to paint the user interface in this instance may take an abnormally long 50 or 60 seconds to finish. Because of the abnormal delay, a user may become frustrated and manually terminate the application after 20 seconds. The fact that the user interface became unresponsive, in this instance, is a bug because it caused the user to abnormally terminate the software.

Another example of a hang involves a scenario where a software application crashes because of an error in a related dynamic link library (.DLL) file. In this scenario, at the time of the crash, the software application has acquired certain system resources, like file handlers and critical sections, which are not released after the crash. Other threads need access to those acquired resources, but cannot gain access to them because they are still marked as locked by the crashed thread. Because of the lock, other running threads hang. The fact that other threads hung indicates a bug that may need to be diagnosed and fixed.

One of the difficulties software providers encounter when troubleshooting hangs is that they are hard to identify, diagnose, and reproduce. For example, hangs are usually not as dramatic as crashes, e.g., there may not be an obvious "blue screen of death"-type response by a computer to indicate a bug, so users are less likely to report the error. Moreover, crashes are easier to diagnose since they tend to occur after a specific instruction or event has been issued. In contrast, identifying the offending instruction or block of code in a hang may be more difficult to do since the bug could be related to another piece of software, to a specific environment on a PC, to an impatient user, or to any number of other issues. Thus, software providers often do not emphasize hangs when fixing bugs.

Therefore, there exists a need for tools to troubleshoot hangs. More specifically, there exists a need for automating the process of diagnosing and troubleshooting software hangs. There also exists a need for client-side tools to aid in the diagnosis of bugs in order to free software provider resources.

SUMMARY

When a software program hangs, implementations of the invention capture data in order to troubleshoot bugs associated with the hangs. From the captured data, attributes may automatically be extracted and compared to known issues. If the hang-inducing bug is known, a user may be provided with a solution to the bug. Alternatively, if the bug is unknown, implementations of the invention send the captured data to be analyzed and fixed by the software's provider.

In additional implementations, if the bug is unknown, the captured data is packaged into a file to be sent to the software provider and assigned an identification value for tracking the hang.

In one implementation, comparing the extracted attributes to known issues is performed on the client computing device in order to determine the potential cause of the hang event. Once the potential cause of the hang event has been determined, troubleshooting steps are performed on the client computing device to quarantine the file, module, process, thread, block of code, instruction, or the like that is likely causing the hang.

Additional features and advantages of the invention will be made apparent from the following detailed description of implementations that proceeds with reference to the accompanying drawings.

DETAILED DESCRIPTION

Figure 1:
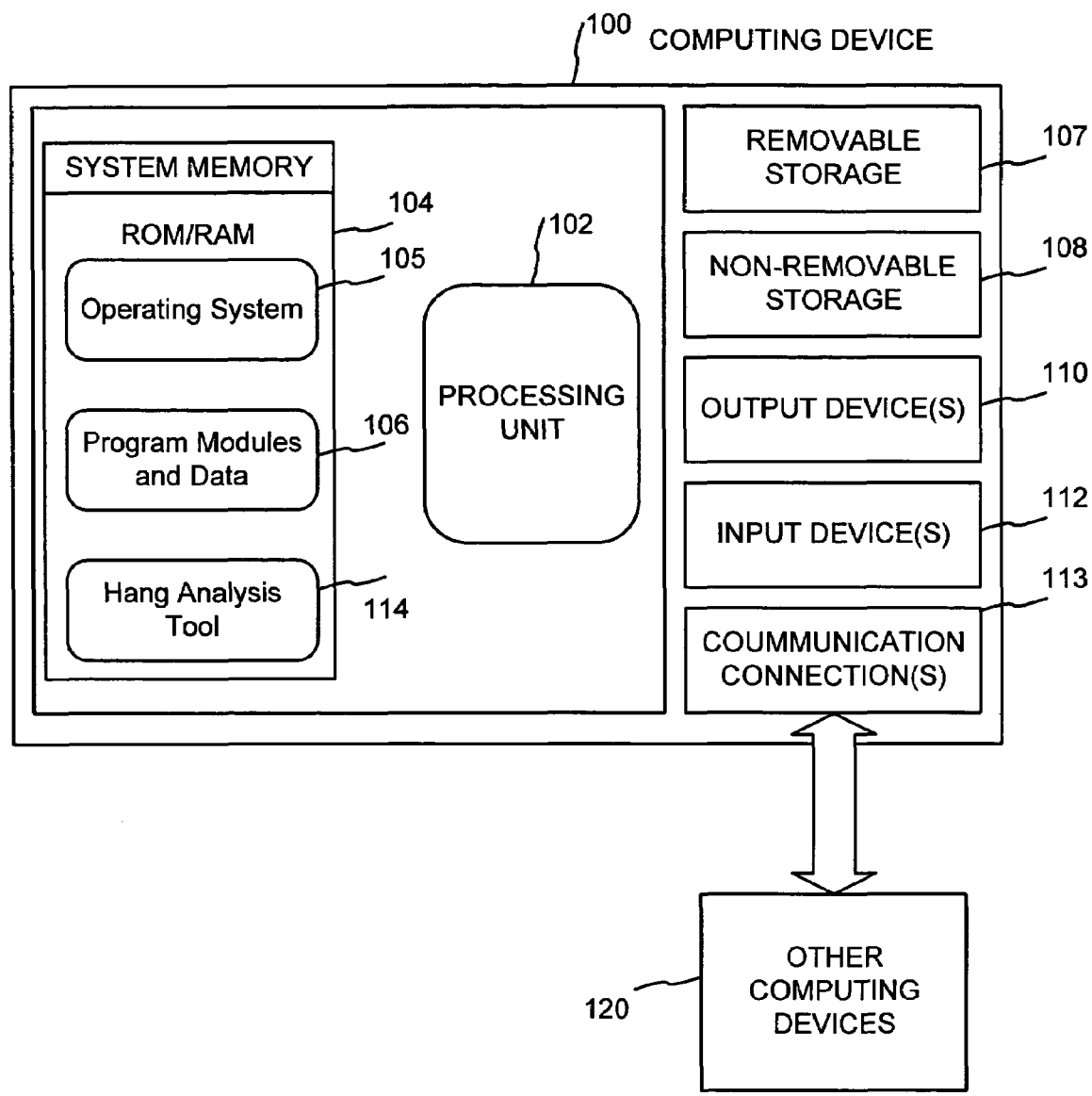
FIG. 1 is a block diagram of a suitable computing environment for implementing aspects of the invention.

FIG. 1 illustrates an exemplary system for practicing the invention, according to one implementation. As seen in FIG. 1, the system includes computing device 100. In a very basic implementation, computing device 100 typically includes at least one processing unit 102 and system memory 104. Processing unit 102 includes existing and future processors, multiple processors acting together, virtual processors, and any other device or software program capable of interpreting binary executable instructions. Depending on the exact implementation and type of computing device, system memory 104 may be volatile (such as RAM), non-volatile (such as ROM, flash memory, etc.), or some combination of the two. System memory 104 typically includes an operating system 105, one or more program modules with their associated data 106, and a hang analysis tool 114.

Computing device 100 may also have additional features or functionality. For example, computing device 100 may also include additional data storage devices (removable and/or non-removable) such as magnetic disks, optical disks, or tape. Such additional storage is illustrated in FIG. 1 by removable storage 107 and non-removable storage 108. Computer storage media may include volatile and non-volatile, removable and non-removable media implemented in any method or technology for storage of information, such as computer readable instructions, data structures, program modules, or other data. System memory 104, removable storage 107, and non-removable storage 108 are all examples of computer storage media. Computer storage media includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by computing device 100. Computing device 100 may also have input device(s) 112 such as keyboard, mouse, pen, voice input device, touch input device, etc. Output device(s) 110 such as a display, speakers, printer, etc. may also be included. All these devices are known in the art and need not be discussed at length here.

Computing device 100 may also include communications connection(s) 113 that allow the device to communicate with other computing devices 120, such as over a network. Communications connection(s) 113 is an example of communication media, which typically embodies computer readable instructions, data structures, program modules, or other data in a modulated data signal such as a carrier wave or other transport mechanism and includes any information delivery media. The term "modulated data signal" means a signal that has one or more of its characteristics set or changed is such a manner as to encode information in the signal. By way of example, and not limitation, communication media includes wired media such as a wired network or direct wired connections, and wireless media such as acoustic, RF, infrared, and other wireless media. The term computer readable media as used herein includes both storage media and communication media.

Figure 2:
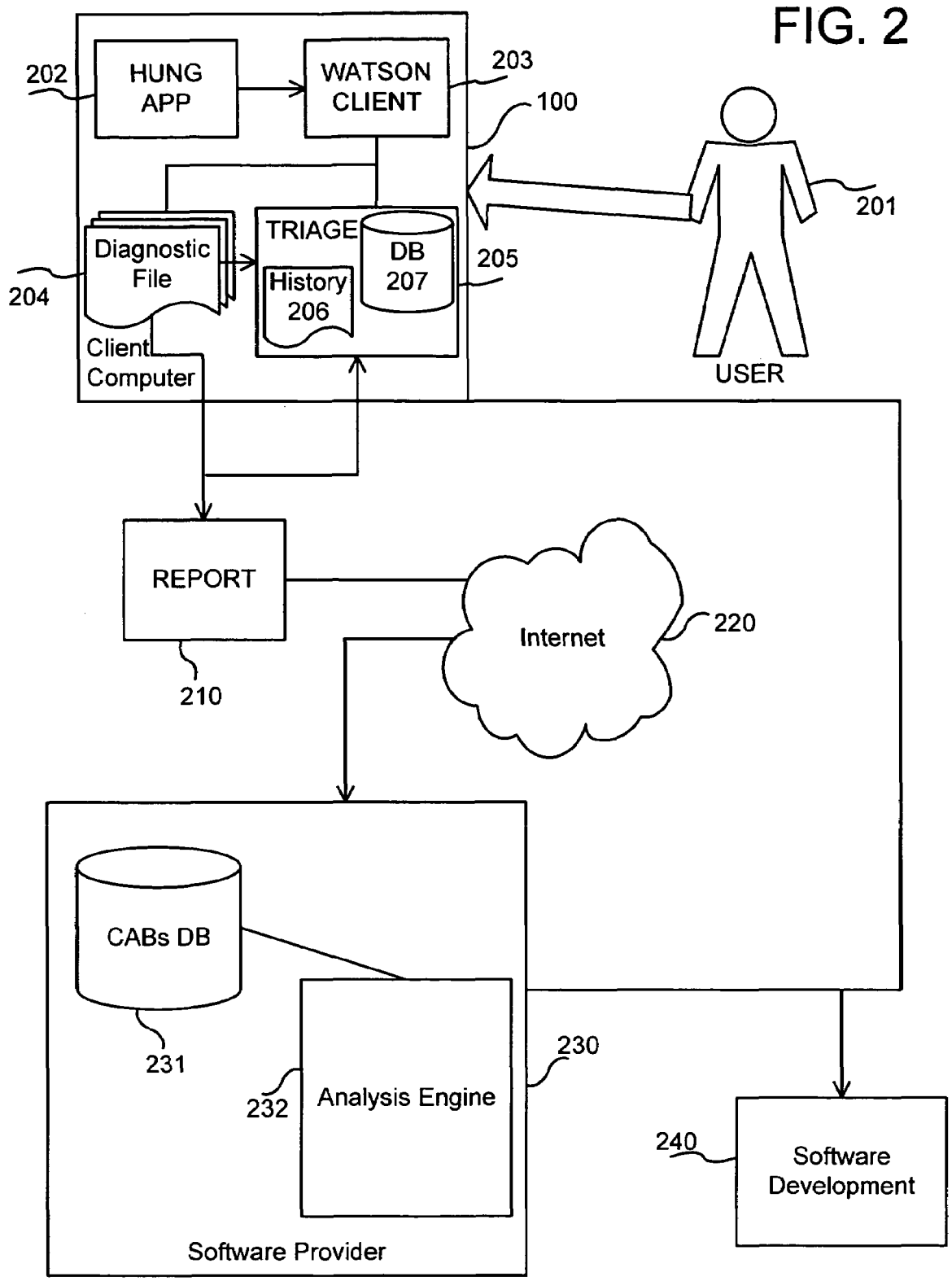
FIG. 2 is a schematic diagram of a hang analysis system, in accordance with an implementation of the invention.

FIG. 2 illustrates exemplary aspects of computing device 100 to capture hang data and to transmit the data to software providers so it can be troubleshot. As seen in FIG. 2, computing device 100 includes components of the invention stored in computer storage media as illustrated in FIG. 1. In one implementation, computing device 100 includes one or more of the following components: one or more program modules with their associated data 202, a data capture program 203, one or more diagnostic data files 204, and a triage evaluator 205. Triage evaluator may further be comprised of a database 207 and one or more history files 206.

The one or more program modules with their associated data (program) 202 may include pieces of software such as a software application, a driver file, an API, a text file, an executable file or any other computer readable instructions, data structures, or software modules.

In one implementation, user 201 accesses program 202, which subsequently hangs. Because of the hang, user 201 terminates the program. Generally to terminate a program, user 201 will issue program termination commands to computing device 100. For example, in a Windows environment, a user may press <Ctrl-Alt-Del> on their keyboard and, when presented with a menu of programs, user 201 may selectively end any running process or thread. Additionally, if the program happens to be an application running in user-mode, user 201 may click on the close command to terminate the process. Similarly, in a UNIX or Java environment, user 201 may issue a "kill" command at a command prompt to terminate hung program 202.

After computing device 100 registers the termination command, data capture program 203 is invoked, which captures data related to hung program 202. The amount of data captured typically is dependant on how sophisticated data capture program 203 is. Some data capture programs, such as Watson, will allow a user to track thousands of instructions. In any event, the captured data includes a wide range of information to diagnose the hang. For example, data capture program 203 may capture a mini-dump of the hang, or alternatively, it may generate a log file containing the running version of the operating system (including support pack numbers), the name of the hung program and its corresponding thread name, software version, names and versions of other software modules or processes loaded into memory, the call stack, or any other information that may help diagnose the cause of the hang. For example, in a Windows environment, after a hang, Watson technologies capture data associated with a hung program. Watson technologies allow a user to specify the amount of data to be captured (e.g., the last 10 events, last 1000 events, etc.) then saves the data to a log file or a mini-dump.

Once hang data has been captured, in one implementation, it is generally stored in a diagnostic data file 204 by the data capture program 203. Diagnostic data file 204 may include a crash dump file, mini-dump, log file, ABEND log, text file, html file, binary file, or any other type of file stored locally or on a remote computer that contains data to help troubleshoot a bug. Additionally, diagnostic data file 204 may include data from one or more hangs. For example, captured hang data may simply be appended to the end of an existing diagnostic data file, or alternatively, diagnostic data file 204 may include a directory of files with diagnostic data. In another implementation, diagnostic data file 204 may include a searchable, relational database, where each hang is added to a database of prior hangs.

As illustrated in FIG. 2, diagnostic data file 204 may be wrapped into a packaged file 210 and transmitted over Internet 220 to software provider 230. Components of packaged file 210 are discussed in more detail in conjunction with FIG. 3.

Packaged file 210 may be sent based on a certain set of criteria. For example, in one implementation, a user may be prompted to send a report to software provider 230 after a hang has been detected. In an alternate implementation, a user may initiate the transmittal of data. In yet another implementation, packaged file 210 may be sent automatically when computing device 100 detects a hang. In another implementation, packaged file 210 may be sent to software provider 230 only after certain conditions are met (e.g., after five occurrences of similar hangs, after a fixed number of days, or after a problem of a certain severity has been encountered.

FIG. 2 also illustrates a triage evaluator 205, which provides a mechanism for initial triage on computing device 100. The triage evaluator 205 performs initial triage on computing device 100 to prevent a repeat of the bug and to speed up the solution process. In one implementation, triage evaluator 205 also extracts attributes from diagnostic data files similar to datamining utility 405 described in conjunction with FIG. 4. In another implementation, the triage evaluator 205 further includes a database 207 of common bugs and issues related to software on computing device 100.

In one implementation, triage evaluator 205 uses diagnostic data file 204 as initial input to determine objects, variables, addresses and modules loaded into system memory. Triage evaluator also maintains a history file 206 that describes ownership and reliability of functions and modules. In one implementation, triage evaluator 205 processes diagnostic data file 204, looks at the call stack and uses the predetermined data in history file 206 to determine the reliability of certain modules and routines. To determine a culprit or faulty component, different weights are assigned to different data based on the information in history file 206. Special values are assigned to candidate files, modules, and routines to calculate the likelihood that a particular module or routine is faulty. Files, modules, and routines become candidate culprits if they are part of the captured data. The assigned values may be as simple (such as a counter value) or more complex (such as a math or statistical algorithm). For example, a module that has recently been patched, is used frequently, and has no history of problems may be assigned the value "unlikely to be the culprit." Another candidate piece of software may be assigned a value "may be the culprit" because it is used often and appears somewhat frequently in hang data. As a final example, an instruction that is always on the call stack when a particular hang appears may be identified as the "likely" culprit. Once triage evaluator 205 isolates the likely culprit (file, module, routine, or instruction), initial triage may be performed. In one basic implementation, triage measures may include renaming the culprit file, installing an original version of a file, attempting to find a newer version of the file, or otherwise quarantining the faulty file, module, routine or instruction.

To further illustrate how triage evaluator 205 works, consider the following example. A user browses the Internet using Microsoft Internet Explorer. At some point, Internet Explorer hangs, invoking Watson, which captures hang data. Here, Watson invokes triage evaluator 205 to perform initial triage on the machine. Triage evaluator has maintained a history of crashes and hangs and notices that the file "bad.dll" is often associated with hangs like the one that just occurred. Thus, triage evaluator marks bad.dll as the likely culprit and attempts to quarantine the file. First, triage evaluator may try renaming bad.dll, but the file is required by Internet Explorer. Hence, triage evaluator attempts to back-rev the file to an older, more stable version, but the current file is the original. Finally, triage evaluator attempts to update the file using Microsoft's Windows Update feature. If triage evaluator succeeds in finding a new file and updating bad.dll, then the bug may be fixed without further user intervention. If triage evaluator does not find a fix, then the diagnostic data files are packaged and sent to software provider 230.

In other implementations, different triage steps may be performed, or they may be performed in a different order. Furthermore, in another implementation, triage evaluator 205 prompts the user for permission to perform triage or prompts the user to perform the triage steps. Other implementations are also available to one of ordinary skill in the art. In one implementation, triage evaluator 205 maintains a known issues database 207, which receives updates from software providers relating to fixes and solutions. For example, the issues database 207 may routinely be updated with new information as it becomes available in a fashion similar to Microsoft's Windows Update system. As part of the triage process, triage evaluator 205 compares diagnostic data to its database. If there is a known solution to a bug, the issues database may either display the solution, retrieve a solution or fix, prompt user 201 for permission to apply a solution, automatically apply the solution, or perform some other similar act. Again, if the bug is unknown, it will be sent to software provider 230 to be troubleshot and diagnosed. Thus, triage evaluator 205 performs initial analysis and triage on a bug, thereby conserving software provider 230 resources, such as bandwidth, development costs, troubleshooting costs, disk space, and the like.

Sending packaged file 210 to software provider 230 may involve copying the packaged file from computing device 100 to software provider 230. The transfer of file may occur by uploading packaged file 210 to a software provider server, sending an email message with packaged file attached, connecting to a support page and attaching the file, or using some other electronic form of communication. In one implementation, packaged file 210 is transmitted over Internet 220. In another implementation, software provider 230 is on the same network (e.g. LAN or WAN) as computing device 100.

Once packaged file 210 has been sent and received by software provider 230, packaged file 210 may be stored in a packaged file repository 231 until it may be evaluated by analysis engine 232. In one implementation, after packaged file 210 has been analyzed, the bug is transferred to software development 240 so the bug can be troubleshot and fixed. In another implementation, after software development has found a solution to the bug, computing device 100 and/or user 201 are notified of the solution.

Figure 3:
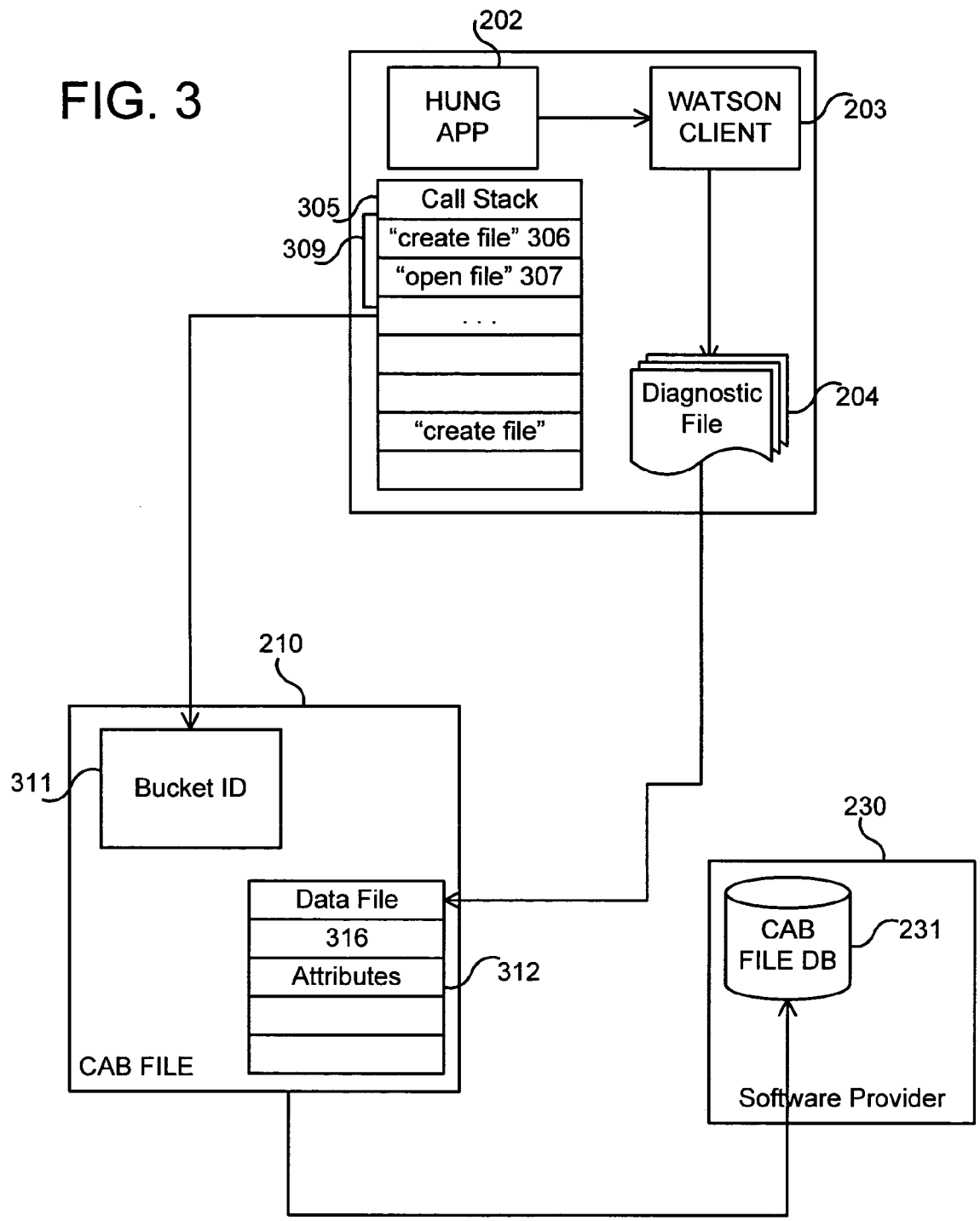
FIG. 3 is a block diagram of a packaged file component, in accordance with an implementation of the invention.

FIG. 3 illustrates an exemplary implementation of packaged file 210. The format of packaged file 210 may be a CAB file, a ZIP file, or any other type of packaged or compressed file. Moreover, packaged file 210 may be encrypted, password protected, or otherwise secured before being transferred to software provider 230. Packaged file 210 typically includes among other components including a bucket ID 311 and at least a diagnostic data file 312. Bucket ID 311 provides a means for labeling the bug so it can be categorized into a bucket. Bucketing involves categorizing classes of similar or related problems, which helps to identify and troubleshoot bugs. Exemplary buckets are described in more detail in conjunction with FIG. 5.

In one implementation, bucket ID 311 may incorporate information such as computer name, user name, MAC address, hardware serial number, client identifier, IP address, or other information uniquely identifying a computing device, user, or bug. In one instance, generating a bucket ID 311 for packaged file 210 involves walking call stack 305 and performing a hash on it. As shown in FIG. 3, call stack 305 may include multiple events, such as "create file" 306, "open file" 307, or "create thread" 308. In the illustrated example, a program calls a create file event, which creates a file with a file handler locked in critical section 309. A subsequent "create thread" event requires access to the "create file" handler. Thus, when the "create thread" event occurs, the newly created thread stalls and hangs because it cannot access the "create file" handler. When the hang is detected, diagnostic data is captured and packaged to send to service provider 230. Call stack 309 is hashed to generate bucket ID and then bucket ID is wrapped into packaged file 210. In this case, the hash of call stack 309 may uniquely identify this particular bug, thus, if other similar hangs have been reported to software provider 230, an evaluation of bucket ID 311 may be sufficient to identify the bug.

As further illustrated in FIG. 3, packaged file 210 includes at least one diagnostic data file 312, containing hang data. In one implementation, diagnostic data file is a CAB file or another type of packaged or compressed file. In another implementation, diagnostic data file 312 may be encrypted, password protected, or otherwise secured.

Diagnostic data file 312 includes one or more attributes 316. Attributes are diagnostic values which are provided by a debugger infrastructure to help troubleshooters understand the environment and events associated with a hang. For example, attributes 316 that may be useful for diagnosing bugs include the name of the program, thread number, application version number, instructions on the stack, and any number of other captured values and events. Attributes 316 may be in a text format or numeric format, depending on the nature of the diagnostic data file 312. Once wrapped up, packaged file 210 is sent to software provider 230 where it is stored in a packaged file repository 231 until it can be analyzed.

Figure 4:
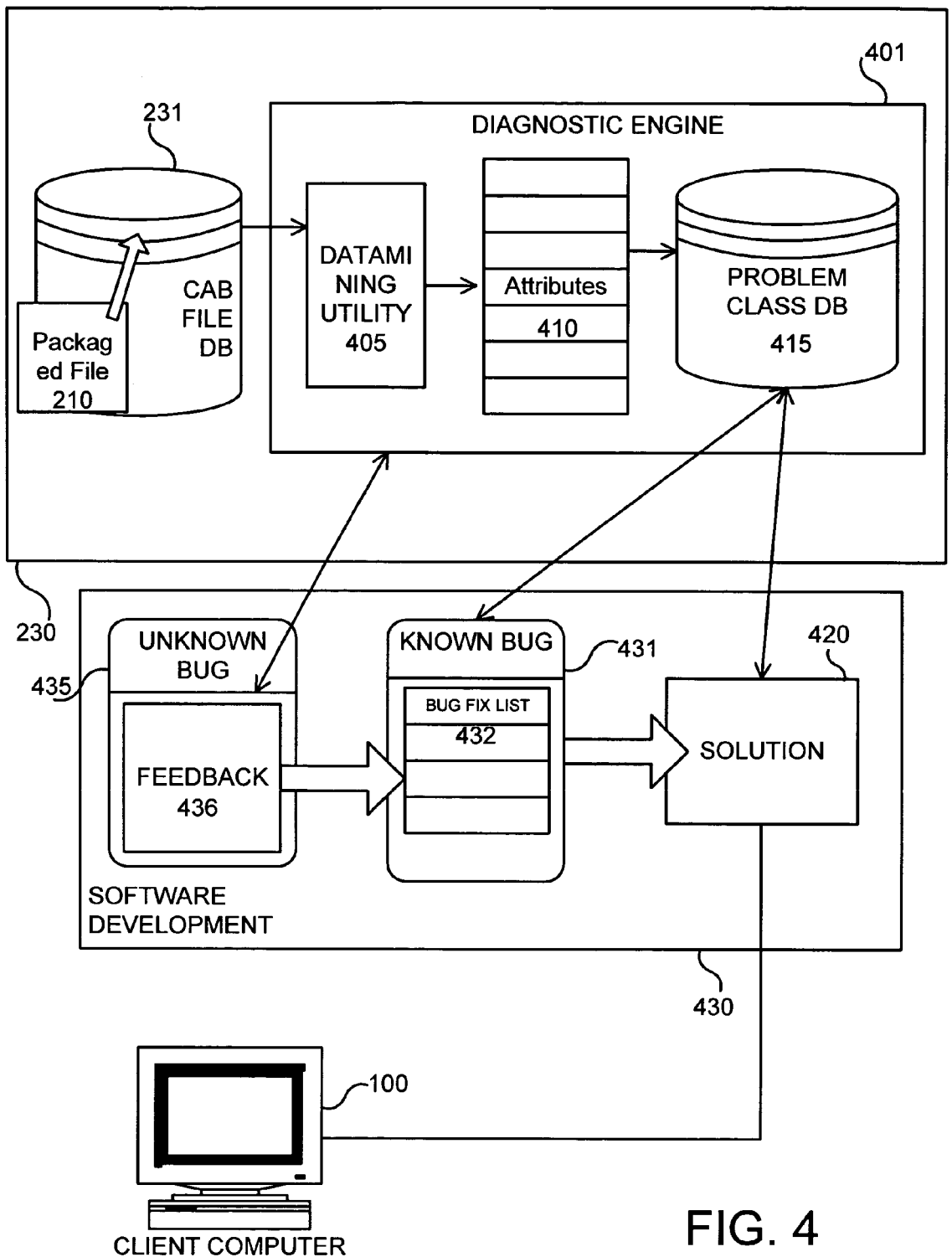
FIG. 4 is a block diagram illustrating a system for identifying a solution to a hang-inducing bug, in accordance with an implementation of the invention.

FIG. 4 illustrates software provider's system for handling packaged file 210. The software provider system is typically a server with components generally similar to those in computing device 100. For example the software provider system would likely include a processor and computer storage media to perform analysis on received packaged file 210. Once received and stored, packaged file 210 may be sent to diagnostic engine 401. In one implementation, when packaged file 210 is received, before being placed in packaged file repository 231, the bucket ID and diagnostic data file are extracted and then stored. In another implementation, packaged file 210 is stored as received and its contents are extracted prior to being analyzed by diagnostic engine 401.

As shown in FIG. 4, diagnostic engine 401 may have several components including a datamining utility 405, an attribute structure 410, and a bucket database 415. Datamining utility 405 loads a packaged file from packaged file repository 231 and extracts attributes from packaged file's diagnostic data files. In one implementation, datamining utility 405 is an automated utility that extracts attributes based on a diagnostic data format. For example, in a Windows environment, mini-dumps may contain cookie crumbs that make attributes identifiable and thus extractable through automated tools. In another implementation, data in packaged file 210 is analyzed by troubleshooters (in this case the troubleshooters become utility 405) in a debugger who manually extract key attributes from the file. In another implementation, datamining utility 405 is a text file, such as a batch file, with a list of commands that are fed into a debugger for extracting attributes from packaged file 210. In all of these cases, datamining utility 405 may look for keywords, binary patterns, offsets, or other recognizable data. Datamining utility 405 repeatedly iterates on the diagnostic data files until no more attributes can be found. Once extracted, attributes are put into an analyzable format, as illustrated by attribute structure 410. Over a period of time, datamining utility will identify a number of problem classes (buckets) and extract a large number of attributes from packaged file(s) 210. As new problems and classes of problems are identified, this information is added to bucket database 415.

Figure 5:
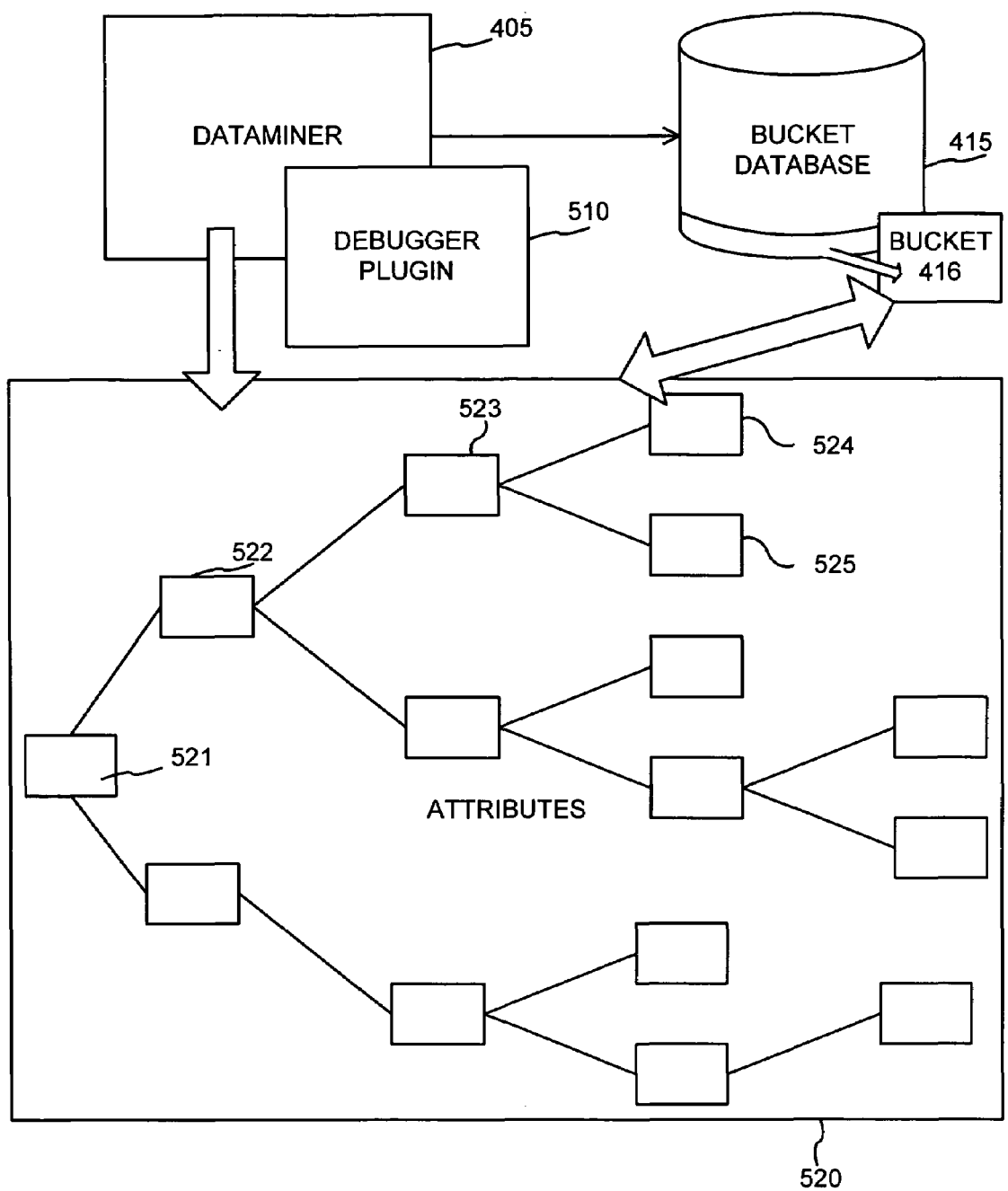
FIG. 5 is a block diagram illustrating a method for extracting attributes from hang data, in accordance with an implementation of the invention.

As illustrated, the extracted attributes are placed in attribute structure 410 in computer storage media. Attribute structure 410 may be a binary tree, an array, a linked list, a text file, HTML file, a database entry, or other comparable data structure that stores and organizes data in an analyzable format. FIG. 5 illustrates another exemplary implementation of attribute structure 410.

In one implementation, after attributes have been mined, diagnostic engine 401 queries its bucket database 415 to see if the mined data in attribute structure 410 belongs to a known bucket. Bucket database 405 consists of entries (buckets) that contain groups of similar or related bugs categorized based on a given set of criteria. Buckets may contain bugs relating to a particular software application, a module name, an application version, the bucket ID, an attribute, a thread name, an error number, a computer address, a user name, a combination of these factors, or some other reasonable means of categorizing software bugs.

In one implementation, attribute structure 410 is compared to entries in bucket database 415. If attribute structure 410 corresponds to a known bucket and a lookup of the bug indicates a solution 420 is available, the solution 420 is sent to computing device 100. In another implementation, if attribute structure 410 corresponds to a known bucket but a fix is not available, then software development 430 is notified and values in the bucket database may be updated.

In yet another implementation, attribute structure 410 is stored according to its associated bucket ID. In still another implementation, only attribute structure 410 is stored. In another implementation, a counter is updated to indicate that one more instance of a bucketed problem has been encountered. Other implementations may store username and computer device identifying data to notify a user when solution 420 becomes available.

As more packaged files 210 are evaluated and bucket database 415 grows as bugs are identified, the stored data may be used to create a bug fix priority list 432 because certain bugs need to be fixed sooner than other bugs. Any number of factors may be used to determine the priority, such as the security risks posed by a bug, the likelihood of data loss, frequency of the error, and other similar factors. For example, if a bug creates an exploitable security flaw in an application, such as a heap overflow error, then that bug will be prioritized higher than other bugs. Similarly, if one bug occurs more frequently than other bugs, that bug will also be prioritized accordingly. In contrast, if a bug happens infrequently with few side effects and would require a rewrite of thousands of lines of code, that bug likely would be assigned a very low priority.

If, in a comparison to bucket database entries, attribute structure appears to identify an undisclosed bug, then diagnostic engine 401 transfers the contents of packaged file 210 to software development 430 for further analysis. Once software development has diagnosed and defined the bug, feedback 436 on the bug is provided to diagnostic engine 401. Feedback 436 may include new attributes that datamining utility 405 should begin looking for. Moreover, bucket database 415 may be updated with new bucket information, so similar issues will be flagged and bucketed properly. Other feedback could include documentation of the bug, workarounds for the problem, or a timeframe for finding a solution to the bug. Any of a number of similar items could be also included in feedback 436. Finally, since the bug has been diagnosed, it will be categorized as a "known" bug and added to bug fix priority list 432.

FIG. 5 illustrates an exemplary attribute structure 520 generated by datamining utility 405 and stored in bucket database 415. Bucket 416 may have numerous relationships with packaged file 210. For example, a given bucket may contain data from many packaged files; hence, the bucket to packaged file mapping may be 1 to many. A given packaged file may contain one or more diagnostic data files, thus, the packaged file to diagnostic data files mapping may also be 1 to many. Moreover, a given diagnostic data file may map to one or more processes. Finally, in one implementation, a given process may map to multiple threads. Other implementations of bucket 416 may include variables, instructions, and other values and events.

Since bucket 416 has many potential attributes, an aspect of the system is to look for natural groupings of attributes within a bucket and see if sub-classifications exist that make sense to pull out, instead of classifying every new bug into a generic "application hang" bucket. For example, datamining utility 405 mines for attributes in order to identify similar issues and bucket them accordingly. However, this process is not trivial. For example, a diagnostic data file containing what appears to be an "idle-related" bug may not actually be bucketed in the "idle" bucket because the idle thread may have been caused by a locked attribute from an earlier crashed application. To solve this problem, it is necessary to see who acquired a lock on the attribute, and if the lock was incorrectly acquired then categorize the bug in a different bucket. Thus, in one implementation, bucketing may be performed initially by technical support personnel, who will flesh out attributes datamining utility 405 should look for and add entries into the bucket database. However, as the database grows, more and more bugs should be handled by the system.

As attributes are extracted by datamining utility 405, attribute structure 520 expands. In one implementation, attribute structure 520 may form a decision tree for each bucket or issue. The decision tree attribute structure 520 is a graphical depiction of the order in which relevant attributes can be utilized to identify entries of the corresponding bucket. In the illustrated implementation, the attributes forming the tree include natural groupings of thread and process level attributes. Here, exemplary nodes 524 and 525 each contain a thread or process level attribute that when examined appear to form a natural grouping, so nodes 524 and 525 are grouped together under node 523. In one implementation, node 523 may contain an attribute that is part of a grouping of attributes. In another implementation, node 523 contains a name created to describe its children nodes. The grouping of nodes under node 523 forms a sub-class of node 522. Similarly, node 522 is a sub-class of node 521.

To illustrate the decision tree concept, in one implementation, the attribute structure for the "APPLICATION_HANG" bucket looks at the natural groupings of attributes below to see if a sub-classification may be created out of the generic APPLICATION_HANG bucket. If there appears to be a natural grouping of attributes from the process and thread level attributes (such as instruction calls or module names) then that group of attributes is made into a sub-class. Alternatively, if the sub-class is large enough, it may become its own bucket. The decision tree creates a logical representation of the data that is easy to search and provides a nice way for software developers to analyze the data. In a variation on the decision tree mode, attribute structure 520 may also look at process and thread-level attributes from different buckets to find dependencies and correlations between them.

Once groupings have been made, they may need to be named. In one implementation, the attributes in a bucket or in sub-class grouping receive a user-friendly name by creating a table that combines one or more attributes into a user-friendly name. The combination can be the result of aggregating attributes, extracting data from another database, or the result of joining other tables. In one implementation, an index is created using bucket names.

Another attribute structure 520 that may be used to retrieve data from bucket database 415 is a Naïve Bayes model, which allows a troubleshooter to choose attributes of interest and a ranked list of attribute-value pairs are presented, showing whether any buckets have the corresponding attribute/value pair. These or other attribute structures create a robust architecture for querying bucket database 415, so that when data from a new hang is received, it can efficiently be compared to previously extracted data.

In one implementation, datamining utility 405 extracts an attribute structure 520 like the one illustrated in FIG. 5. Here, an attribute(s) is placed at the root or topmost level of the tree 521 and other attributes 522–525 are added which fill out attribute structure 520 as they are extracted and grouped. For example, software provider receives a packaged file, processes the packaged file, and extracts attributes from it to form an attribute structure. Once attribute structure 520 has been filled with values, a comparison can be made to already existing data in bucket database 415. In one implementation, the entire attribute structure 520 may be compared for equivalence to entries in bucket database 415. If attribute structure 520 matches an entry in bucket database 415, then the bug is known and subsequent action may be based on this fact.

Comparing the entire attribute structure 520 to an entry in bucket database 415 may include comparison of nodes at each level of the tree. For example, the attributes in the topmost nodes are compared to see if they are reasonably equivalent. If so, then the next level of values is compared to see if the values are reasonably equivalent to similarly structured values in bucket database 415. The process is continued until all the nodes of attribute structure 520 have been evaluated. If the nodes match up at every level then it is likely safe to assume two are equivalent. Fore example, one comparison may find that the topmost node 521 contains a value, "IsReportingFault," which is equivalent to the topmost value of bucket database's entry 415. Since the attribute is present in both structures, a comparison between next level nodes is made. Here, sub-class 522 may consider the situation where another thread in the process was busy packing a Watson report, while the user interface thread was still trying to display the hung user interface to the user. If the attribute is present in both structures, the comparison proceeds until the tree has been traversed, in which case the bug is known, or until the two trees diverge, at which point the bug is reported to software development.

In another implementation, if attribute structure 520 is reasonably equivalent to an entry from the bucket database 415 based on predetermined criteria, then the issue may also be known and subsequent action will be based on this fact. The predetermined criteria could be any of a number of factors, such as if a statistically significant number of attributes are similar, the three top instructions on the call stack are the same, or some other relevant criteria. For example, if attribute structure 520 reveals that an application hung on one particular thread, that fact alone may be sufficient to classify the file as pertaining to a particular bucket. In another implementation, several instructions taken together may sufficiently identify a bug and merit classification in one bucket as opposed to another. If it is determined that a bug is unknown, the diagnostic data files may be forwarded to software development for further analysis. As the bug is diagnosed, bucket database 415 may be updated. Updated information may include adding a new bucket or it adding new nodes to an existing bucket.

In one implementation, attribute structure 520 could allow troubleshooters to reproduce the bug. Packaged file 210 may contain enough data to automatically figure out common occurrences needed to reproduce the bug. In another implementation, aspects of datamining utility 405 are off-loaded to computing device 100. Much of the attribute extraction can be performed by a datamining utility local to computing device 100. The resulting attribute structure 520 could then be packaged and sent to software provider. In an alternative implementation, all aspects of the system related to known bugs can be offloaded to the user's computing device.

The datamining utility 405, in one implementation, is extensible so that analysis on the diagnostic data files is done in a single interface. The datamining utility 405 may be enhanced by adding attribute specific extensions 510 for different programs; thus, software providers can mine Watson-like attributes for their specific application. Moreover, extensions 510 can be added to the data capture program on computing device to gather third-party software specific data.

Figure 6:
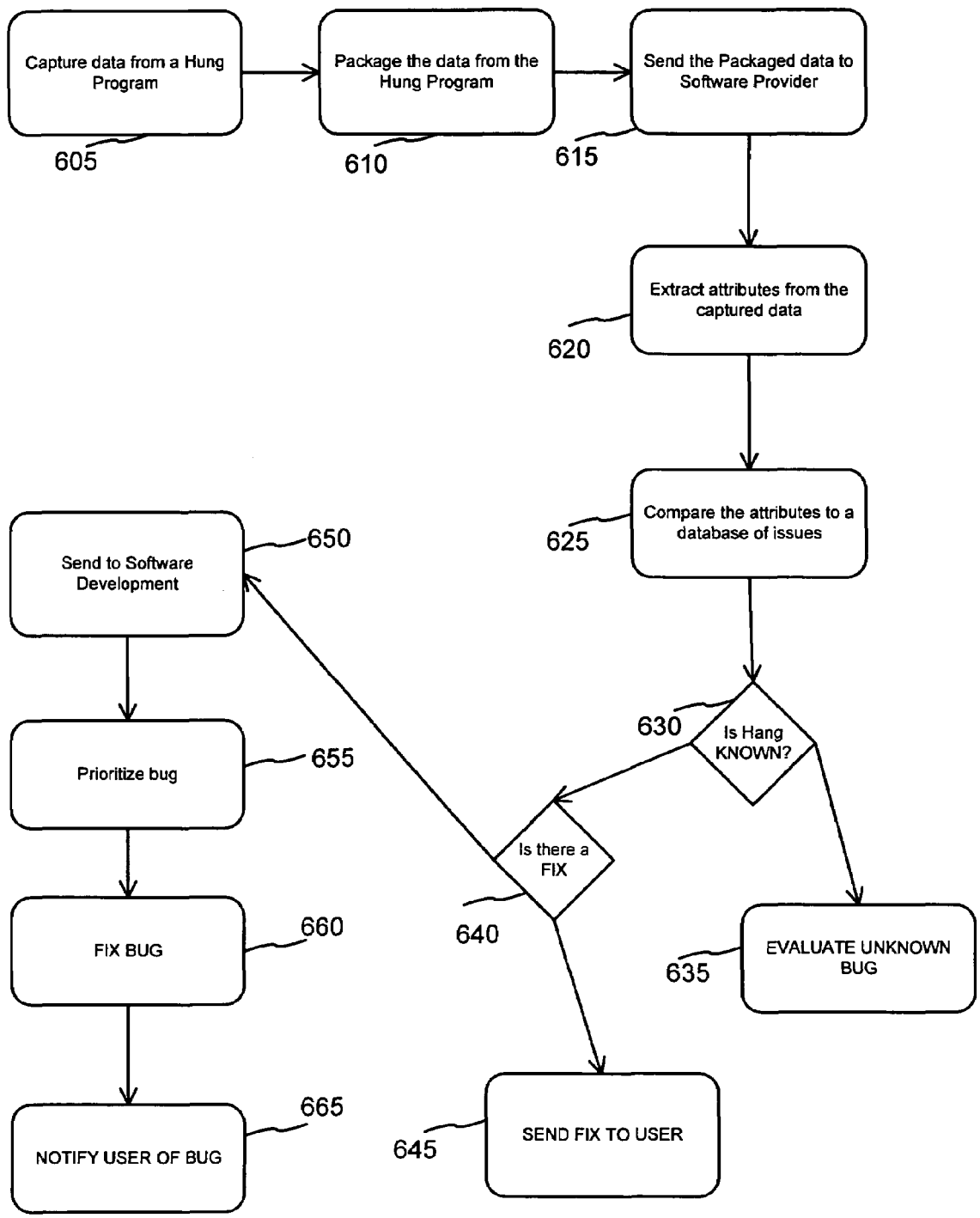
FIG. 6 is a flowchart of a method of analyzing a hang, in accordance with an implementation of the invention.

FIG. 6 illustrates a method for finding a solution to hang-inducing bug. In one implementation, finding a solution to a bug involves first capturing data from a hung program on a computing device 605. Once hang data has been captured, the data is packaged into a file to be sent to a software provider for analysis 610. The packaged data is sent 615 and eventually received by software provider. Upon receipt of the packaged data, attributes are extracted from the captured data in order to determine relevant characteristics of the hang 620. The extracted attributes are compared to entries in a database containing known bugs 625. Comparing the captured data to the database entries will likely identify whether the hang-inducing bug is a known bug 630.

Figure 7:
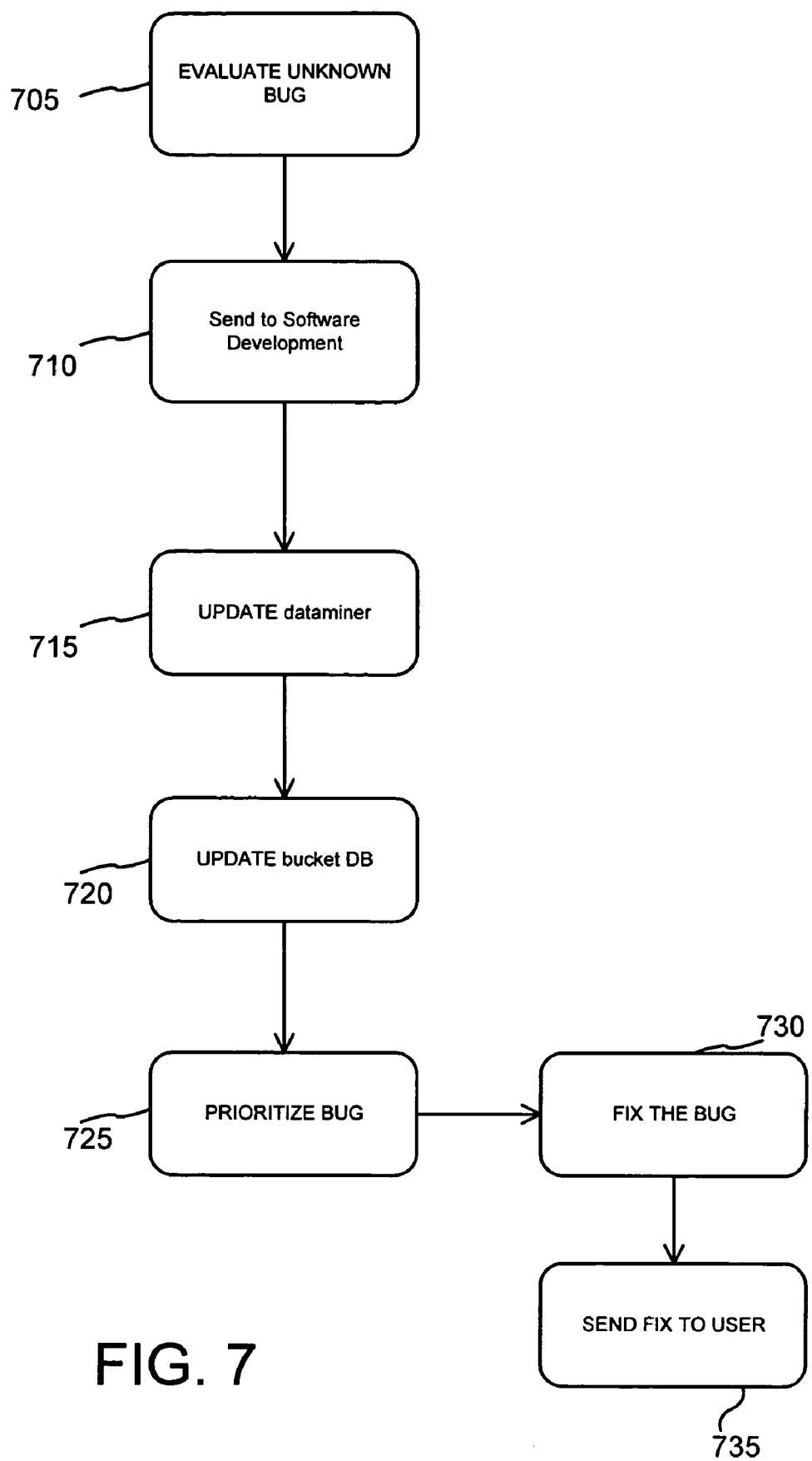
FIG. 7 is a flowchart of a method of analyzing an unknown bug, in accordance with an implementation of the invention.

If the bug is not known, then additional analysis as illustrated in FIG. 7 will likely be performed 635. If the bug is known, then a check is made to see if there is a solution to the bug 640. If there is an available solution, it is sent back to the computing device 645. Alternatively, if a fix is not available, then the captured data is sent to software engineering for further analysis 650. Once software engineering has analyzed and diagnosed the bug, it is prioritized according to a set of predetermined criteria 655 and later fixed 660. After a fix becomes available, computing devices that reported the bug are notified 665. FIG. 7 illustrates the method for finding solutions to unknown bugs. As described in conjunction with FIG. 6, data from a hung program is captured and reported to a software provider. When the software provider determines the reported bug is an unknown bug it must be properly diagnosed 705. To diagnose the bug, the captured hang data is sent to software engineering 710. After, software engineering diagnoses the bug, several steps may occur in any order. A database of known issues is updated to indicate that the bug is known, so subsequent files reporting the same bug will be classified appropriately 720. The mechanism for extracting attributes from the bug report may be updated to look for new attributes or to include more data about a particular attribute 715. Finally, the bug may be prioritized as to when it should be fixed 725. Priority may be determined by a variety of factors such as FIFO (first-in, first-out), LIFO (last-in, first-out), security concerns, convenience concerns, time concerns, and other similar factors. Once the bug has been identified, software engineering may fix the bug 730, at which point the computing device where the bug originated is notified of the available fix 735. Alternatively, fix is sent to the user.

Figure 8:
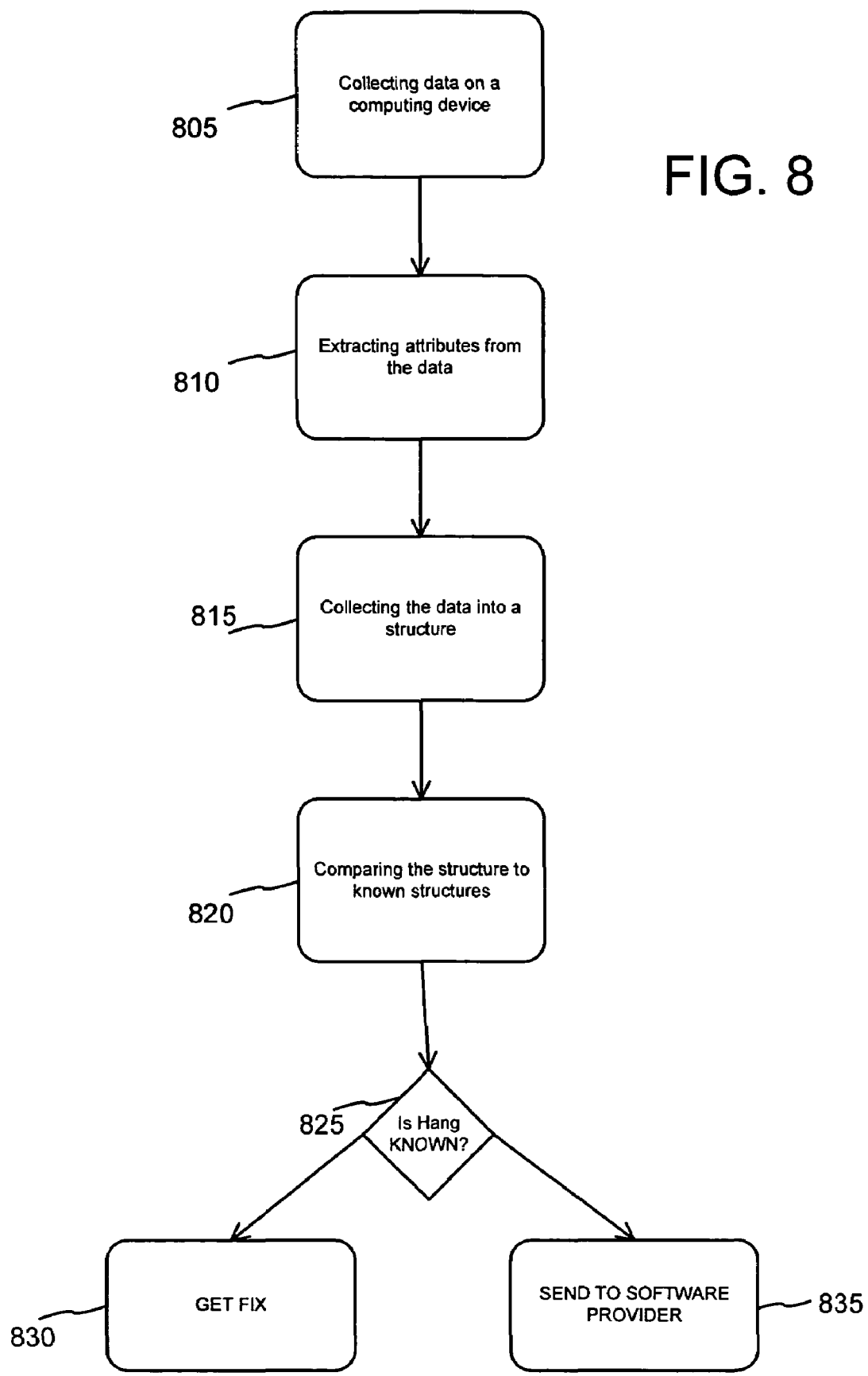
FIG. 8 is a flowchart illustrating a method of identifying a bug, in accordance with an implementation of the invention.

FIG. 8 illustrates a method for generating an attribute structure to make a comparison between hang data and a database of known issues. Initially, data is collected and captured on a computing device 805 after a hang. Either locally on the computing device or on a remote system, attributes are extracted from the collected data 810. The extracted attributes are grouped into a logical structure, such as an array, binary tree, linked list, or other data structure, to represent the hang-inducing bug. The resulting attribute structure is compared to previously determined structures in order to determine whether that particular bug has already been fixed. If a hang is known, steps are taken to find a solution and notify a user when a solution becomes available. Otherwise the captured data is sent to the program provider for further analysis 835.

The methods and systems illustrated herein describe the functionality of several system components such as the triage evaluator, attribute structure, datamining utility, and bucket database. It should be understood that the functionality ascribed to any one these and other components described above can also be performed by any of the other related components if they are programmed to do so.

In view of the many possible implementations to which the principles of our invention may be applied, we claim as our invention all such implementations as may come within the scope and spirit of the following claims and equivalents thereto.

We claimed:

1. A method of troubleshooting software hangs on a computing device, the method comprising:
    capturing data associated with a hang;
    extracting attributes associated with the hang;
    comparing the extracted attributes to a database of issues to troubleshoot the hang;
    performing on the computing device the comparison of extracted attributes to the database of issues;
    assigning the extracted attributes a value based on a history of hang events;
    determining a potential culprit for the hang event based on the assigned values; and
    performing troubleshooting steps to quarantine the potential culprit;
    wherein performing troubleshooting steps to quarantine the potential culprit comprises renaming a file.

2. The method of claim 1 further comprising:
    packaging the captured data into a file; and
    assigning the packaged file an identification value for tracking the hang.

3. The method of claim 2 wherein the identification value comprises a hash value associated with a call stack.

4. The method of claim 1, wherein comparing the extracted attributes further comprises:
    identifying the hang; and
    providing a user with a solution to the hang, if the solution is available.

5. The method of claim 1, wherein capturing data associated with a hang further comprises extending a schema by using a data capture program extension.

6. The method of claim 1, wherein extracting attributes to diagnose the hang further comprises extending an attribute extraction schema through the use of an attribute plugin.

7. The method claim 1, wherein the database of issues comprises data to represent at least one hang event.

8. The method of claim 1, wherein the potential culprit comprises one of a file, module, process, thread, block of code, or instruction.

9. The method of claim 1, further comprising updating the history of hang events.

10. A computer readable storage medium comprising executable instructions for performing a method of troubleshooting software hangs on a computing device, the method comprising:
    capturing data associated with a hang;
    extracting attributes associated with the hang;
    comparing the extracted attributes to a database of issues to troubleshoot the hang;
    performing on the computing device the comparison of extracted attributes to the database of issues;
    assigning the extracted attributes a value based on a history of hang events;
    determining a potential culprit for the hang event based on the assigned values; and
    performing troubleshooting steps to quarantine the potential culprit;
    wherein performing troubleshooting steps to quarantine the potential culprit comprises renaming a file.

11. The computer readable storage medium of claim 10, the method further comprising:
    packaging the captured data into a file; and
    assigning the packaged file an identification value for tracking the hang.

12. The method of claim 10, wherein the identification value comprises a hash value associated with a call stack.

13. The computer readable storage medium of claim 10, the method further comprising:
    identifying the hang; and
    providing a user with a solution to the hang, if the solution is available.

14. The method of claim 10, wherein capturing data associated with a hang further comprises extending a schema by using a data capture program extension.

15. The method of claim 10, wherein extracting attributes to diagnose the hang further comprises extending an attribute extraction schema through the use of an attribute plugin.

16. The method claim 10, wherein the database of issues comprises data to represent at least one hang event.

17. The method of claim 10, wherein the potential culprit comprises one of a file, module, process, thread, block of code, or instruction.

18. The method of claim 10, further comprising updating the history of hang events.

19. A computer-enabled system comprising:
    means for capturing data associated with a hang;
    means for extracting attributes associated with the hang;
    means for comparing the extracted attributes to a database of issues to troubleshoot the hang;
    means for performing on the computing device the comparison of extracted attributes to the database of issues;
    means for assigning the extracted attributes a value based on a history of hang events;
    means for determining a potential culprit for the hang event based on the assigned values; and
    means for performing troubleshooting steps to quarantine the potential culprit;
    wherein performing troubleshooting steps to quarantine the potential culprit comprises renaming a file.

* * * * *